United States Patent [19]

Floyd et al.

[11] 4,411,280
[45] Oct. 25, 1983

[54] VENTILATED THERMOPLASTIC POLYMER FOAM FILTER RODS

[75] Inventors: Terry S. Floyd, Clover, S.C.; Donna G. Rhoden, Charlotte, N.C.; Walter E. Bradley, Fort Mill, S.C.

[73] Assignee: Celanese Corporation, New York, N.Y.

[21] Appl. No.: 301,251

[22] Filed: Sep. 11, 1981

[51] Int. Cl.³ ............................................... A24D 3/04
[52] U.S. Cl. ................................... 131/332; 131/336; 264/DIG. 14; 264/DIG. 48
[58] Field of Search ...................... 131/332, 336, 381; 264/53, 51, 177 R, 211, DIG. 14, DIG. 48

[56] References Cited

U.S. PATENT DOCUMENTS

| | | | |
|---|---|---|---|
| 2,988,088 | 6/1961 | Schur | 131/336 |
| 3,574,134 | 12/1970 | Dock | 131/336 |
| 3,678,941 | 7/1972 | Dixon | 131/336 |
| 4,232,574 | 11/1980 | Hall | 131/336 |
| 4,282,890 | 8/1981 | Howell et al. | 131/332 |

FOREIGN PATENT DOCUMENTS 2009667 12/1978 United Kingdom .

*Primary Examiner*—V. Millin
*Attorney, Agent, or Firm*—Robert J. Blanke

[57] ABSTRACT

Ventilated thermoplastic polymer foam filter rods and the processes for their preparation. The ventilated thermoplastic polymer foam filter rods are characterized by the presence of at least some cells which are bridged by fibrils, the rod being surrounded by a high density skin structure having a discontinuity such as to produce a ventilation of at least 50%. Discontinuity in the skin structure may be produced by skin solvent etching, skin abraiding, skin perforating and skin cutting.

7 Claims, 11 Drawing Figures

VENTILATED THERMOPLASTIC POLYMER FOAM FILTER RODS

This invention relates to a method of manufacturing ventilated foamed thermoplastic polymer filter rods and the product produced thereby. More specifically, the invention relates to the ventilation of filter rods produced from a polyolefin or cellulose ester melt extrusion process, the unventilated filter rods having an open cell structure with a substantially water and air impervious skin structure surrounding the periphery of the rod.

Foamed thermoplastic polymer filter rods are known, polyolefin foamed filter rods being disclosed in U.S. Pat. Nos. 3,939,849 and 4,054,550 and cellulose acetate foamed filter rods being disclosed in U.S. Pat. Nos. 3,574,803 and 4,180,536. The polyolefin foamed filter rods are characterized by a high density substantially water impervious skin structure.

Foamed cellulose acetate cigarette filters having a porous skin structure are known, such filters being disclosed in U.S. Pat. No. 3,574,803. The cellulose acetate foams of the patent are prepared by dissolving an inert gas under pressure into ripened cellulose acetate dope at its incipient precipitation point and precipitating cellulose acetate while reducing the pressure on the dope to produce a solid foam and then washing the foam to purge the foam of residual acetic acid and salt. In order to obtain an acceptable product, it is essential that water soluble salts and acetic acid be washed from the solid foam and therefore, all areas of the foam structure must have a maximum exposure to the washing operation. This process results in a product having a water and air pervious area on the periphery of the foamed rod and also results in a product having a cell structure with an average density of about 0.13 grams per cubic centimeter.

More recently, melt extruded cellulose acetate open cell structure foamed filter rods have been produced, such structures being disclosed in U.S. Pat. No. 4,180,536. The melt extruded product is prepared from a mixture of cellulose acetate, plasticizer, a nucleating agent and a volatile liquid blowing agent which is at least a partial solvent for the cellulose acetate. The composition is melt extruded under conditions wherein the melt is subjected to high shear and the loss of the blowing agent through backflow is prevented. The melt is reduced in temperature prior to extrusion and the extrudate is conditioned in a hot air chamber and then sized in a sizing die. The resultant product may be characterized as being cylindrical with a well-formed skin which is found to be substantially water and air impervious. It should be understood that processing conditions may, in some cases, inhibit the formation of a skin structure in a localized area. Within the skin is an interconnecting expanded cellular foam, at least some of the cells being further characterized by the presence of fibrils bridging the cell walls, the entire structure having a high ratio of membraneous cell walls to fibrils.

The filter of U.S. Pat. No. 4,180,536 provides a large available surface for the capture of smoke particles due to the small cell size and the presence of fibrils within at least some of the cells. Because of this geometry, the melt extruded cellulose acetate foamed cigarette filter has a higher smoke removal efficiency than precipitated cellulose acetate foamed cigarette filters of U.S. Pat. No. 3,574,803.

Current trends in filter design require varying degrees of ventilation or air dilution to reduce overall smoke delivery. This is achieved by creating air passages in the filter tip perpendicular to the tip axis permitting diluting air to enter the smoke mainstream. On the more conventional cellulose acetate tow filters, this is accomplished by the use of porous plug wrap, mechanical perforation, laser perforation and so forth. It is therefore readily apparent that a high efficiency filter rod possessing a water and air pervious skin requiring only a preperforated or porous tipping paper in manufacture would provide virtually unlimited tip design flexibility and eliminate costly ventilating procedures.

It is therefore an object of this invention to provide a high efficiency thermoplastic polymer cigarette filter rod characterized by interconnecting expanded cellular foam, at least some of the cells having fibrils bridging the cell walls, the rod having a skin structure which is water pervious and sufficiently air pervious to provide ventilated filters.

It is another object of this invention to provide a high efficiency cellulose acetate filter rod characterized by interconnecting expanded cellular foam, at least some of the cells having fibrils bridging the cell walls, the rod having a skin structure which is water pervious and sufficiently air pervious to provide ventilated filters.

It is still another object of this invention to provide a process for the preparation of high efficiency thermoplastic polymer cigarette filter rods characterized by interconnecting expanded cellular foam, at least some of the cells having fibrils bridging the cell walls, the treated rods having a skin structure which is water pervious and sufficiently air pervious to provide ventilated filters.

These and other objects of the invention will become more readily apparent from the following detailed description of the invention.

In accordance with this invention, it has now been discovered that in a high efficiency thermoplastic polymer cigarette filter rod having a skin structure and characterized by interconnecting expanded cellular foam, at least some of the cells having fibrils bridging the cell walls, the skin structure can be rendered porous by partial or total removal or disruption of the skin structure. Specific means for treatment of the skin structure include skin solvent etching, skin abrading, skin perforating and skin cutting. It should be understood that skin cutting includes total removal of the skin structure. In the case of cellulose acetate cigarette filter rods, the preferred process for treatment of the skin structure is solvent etching. The solvent may be selected from the group consisting of acetone, methylene chloride, triacetin, tetrahydrofuran, methylethyl ketone, diethyl ketone, dioxane, alkyl cellulose, low boiling organic acids, low boiling phenols and low boiling aldehydes. It should be understood that where compatible, aqueous combinations of any of the above may be employed. The preferred solvent is acetone. Preferably, the solvent is contacted with the filter rod surface by means of a spray impinged directly onto the rod. Etching of the skin by means of the spraying technique is preferred in that a completely random porosity of the filter rod skin structure can be obtained, such random porosity being difficult to produce with mechanical techniques. Spraying techniques include both aspirating and airless spraying. Skin removal techniques while obtaining desirable random surface necessitate the use of an oversized cigarette filter rod with considerable weight loss being generated by mechanically abraiding or cutting away the skin structure.

Irrespective of the process employed, the product of the instant invention may be characterized as a cigarette filter rod having a substantially open cell thermoplastic foam characterized by the presence of at least some cells which are bridged by fibrils, said filter rod having a skin structure substantially higher in density than the central portion of said filter rod. The skin structure is water and air pervious having discontinuities such as to produce a rod having a % ventilation of at least 50% and preferably at least 80%. In the case of cellulose acetate cigarette filter rods, the average density of the rod is less than about 0.13 grams per cubic centimeter. Preferably, the cellulose acetate rod pores are produced from solvent etching, randomly disposed within the skin structure and most preferably the pores have an average size of from about 50 to 150 microns and an average frequency of from about 15 to 500 pores per square millimeter.

The term, "% ventilation", as employed herein is a numerical value obtained by testing a 27 millimeter filter rod sample in a digital dilution tester marketed by Instrument Technical Representatives of 7400 White Pines Road, Richmond, Va. 23234. The sample is placed in a housing equipped with air inlet means and air outlet means, air being caused to pass radially through the porous skin and axially through the inlet tip portion of the sample and exit at 17.5 cubic centimeters per second (air flow out) through the exit tip portion of the sample. Air inlet flow or pressure drop through the skin is then measured by the device which gives a reading of:

$$\% \text{ Ventilation} = \frac{\text{Air inlet flow through the skin (100)}}{\text{Air flow out}}$$

In operation, the pressure drop across the sample skin is converted to a millivolt signal by a differential pressure transducer. A demodulator converts the millivolt signal to a 0–10 volt signal which corresponds to 0–100% ventilation. A total of 30 cigarette filter rods are tested and the average result reports.

A better understanding of the invention may be had from a discussion of the drawings wherein.

Figure 1:
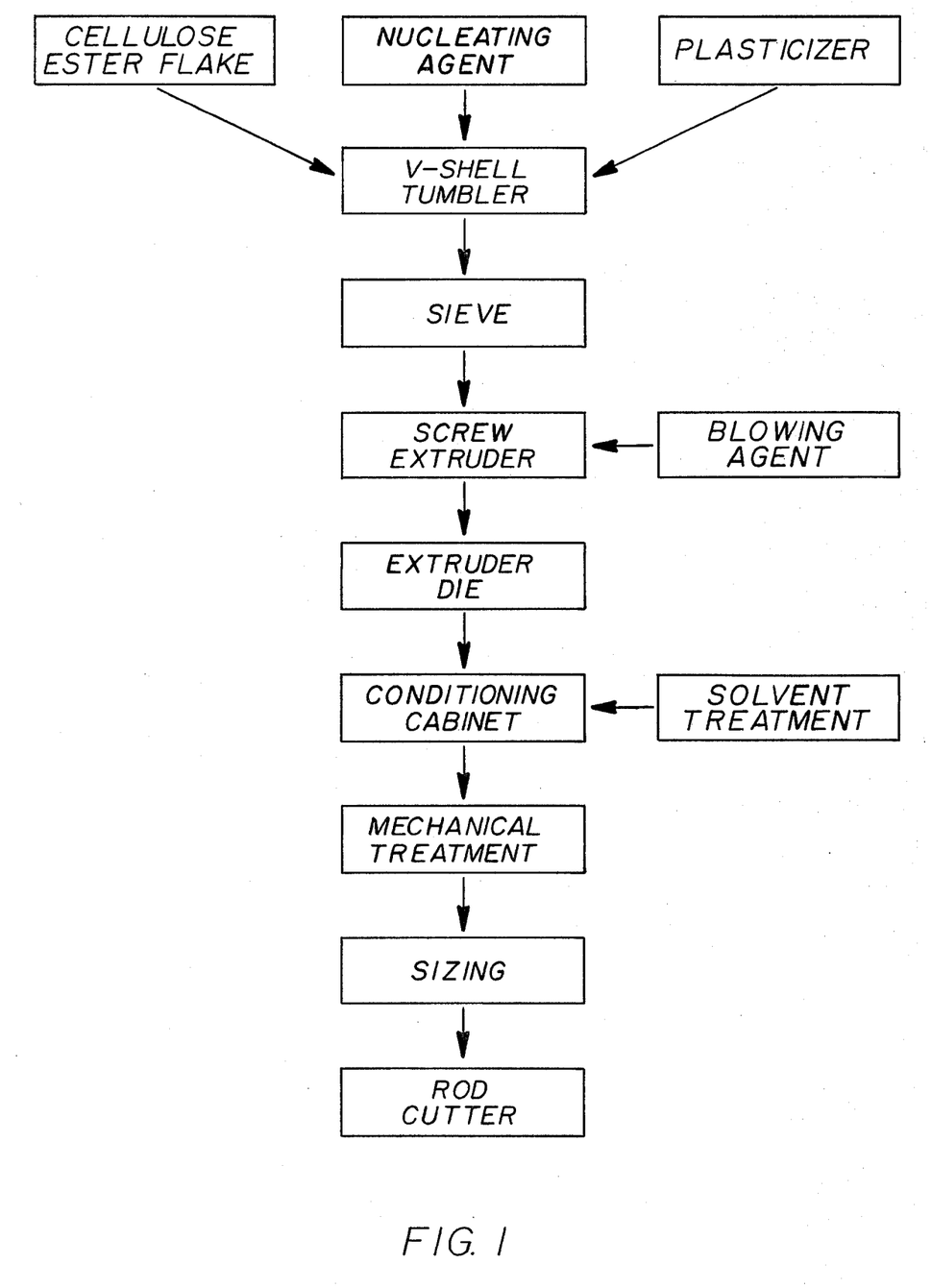
FIG. 1 is a flow diagram of certain processes for producing the ventilated filter element of this invention.

Turning to FIG. 1 of the drawings, cellulose acetate flake, from 10 to 26 percent by weight of a plasticizer based on the weight of the total composition and 0.5 to 15 percent by weight of a nucleating agent based on the weight of the total composition are fed into a tumbler, mixed and then dried to the moisture content less than about 0.5% $H_2O$. Alternatively, the cellulose acetate flake may be dried before mixing, drying in either case being carried out to prevent moisture from causing agglomeration.

The plasticizer is a non toxic, taste compatible, and thermally stable plasticizer having a boiling point of not less than about 180° C., sections selected from the group consisting of esters of saturated dibasic acids, esters of saturated polyhydric alcohols, fatty acid esters and sulfonamide resins. The most preferred plasticizer is a plasticizer selected from a group consisting of glycerol triacetate, triethylene glycol diacetate and mixtures thereof. Glycerol triacetate and triethylene glycol diacetate may also be employed as plasticizers together with various amounts of polyethylene glycol.

Suitable nucleating agents preferably are inorganic materials of high surface area, preferably 0.28 sq. meters per gram or greater and which produce more cells in the foam than would be produced in their absence.

The nucleating agent is preferably a nucleating agent selected from the group consisting of molecular sieve materials, titanium dioxide, perlite, diatomaceous earth, limestone and talc. It should be understood however, that other non toxic, thermally stable, uniform particle size, inorganic nucleating agents may be employed as long as these nucleating agents do not impart undesirable color to the extrudate. After tumbling and drying, the mixture is removed from the tumbler and preferably sieved so as to remove oversized particles and obtain a satisfactory molding powder.

The molding powder is then fed at a constant rate to an extruder which preferably has the following characteristics: good forwarding with narrow residence time distribution, i.e., minimum back mixing; multiple zone temperature control with good heat transfer temperature control for heating and cooling; good mixing of components, particularly the blowing agent with minimal heat buildup; minimal post screw residence time and minimal post screw laminar flow to prevent wall layer degradation. Preferably, the screw extruder revolutions per minute are controlled to provide minimum residence time with minimum shear degradation period, preferably the extruder is also divided into a plurality of temperature control zones, the first zone being the hopper wherein temperatures are controlled in the range of from 20° to 100° centigrade to prevent agglomeration of cellulose acetate flake. The second temperature control zone is the melting zone wherein temperatures are maintained within the range of 100° to 240° C. and preferably from 150° to 200°C. In this second zone, a vent port should be employed so as to allow water and entrained air to escape to the atmosphere. In the third zone, the temperature of the material in the extruder is kept above the glass transition and rubber transition temperature. The blowing agent in quantities of 2 percent to 7 percent by weight based on the weight of the total composition is injected into the third zone while temperatures are controlled within the range of from 200° to 300° C. and preferably 220° to 240°C. The cellulose acetate melt containing a blowing agent then passes through a fourth zone which is a mixing zone, maintained at a temperature less than zone 3. The flowing agent which is injected into the third zone is at least a partial solvent for cellulose acetate and is selected from the group consisting of water, ketones, esters and monohydrate alcohols having boiling points no higher than 120°C. Preferably, the blowing agent is selected from the group consisting of acetone, methylethyl acetate, ethyl acetate, methanol, ethanol, propanal and water.

The screw extruder employed in this invention may be either a single screw extruder or a twin screw extruder. Twin screw extruder devices, however, have been found to be preferable in that the twin screw devices minimize any tendency of the melt to surge or pulsate through the extruder due to better stabilization of the pressure profile along the length of the twin screw extruder.

The material from the screw extruder is passed to an extrusion die. The die temperature is accurately controlled in order to achieve target rod diameter and desired filter property. The melt extrusion stage is followed by a transfer of the material to a temperature control zone which constitutes a conditioning cabinet which has inlet and outlet openings to permit the rod to pass through and means for controlling the temperature in the cabinet. The cabinet controls skin temperature and porosity to allow escape of the blowing agent. Temperatures of about 45° to within 5° C. of the glass transition and rubber transition temperature of the extrudate are maintained. If a solvent treatment of the rod is employed, solvent is applied to the rod at any point subsequent to emerging from the extruder die. If a mechanical treatment is employed, the rod may be mechanically treated either before or after sizing. Preferably, mechanical treatment takes place prior to sizing.

The following specific examples are given for purposes of illustration and should not be considered as limiting the spirit or scope of this invention.

EXAMPLE 1

Cellulose acetate flake is ground in a mill to a particle size of less than 3 millimeters. A molding powder composition is then prepared by intimately mixing 78.9 weight percent undried cellulose acetate flafe (5% H$_2$O), 16.9 weight percent of glycerol triacetate plasticizer and 4.2 weight percent talc nucleating agent. This compound is then dried for 2 hours at 90° C. to reduce the moisture level to less than 0.5 weight percent. The dried compound is allowed to cool to room temperature and is precision fed to a twin screw extruder through a cooled feed throat. The material is melted and vented to remove entrained air and any remaining water vapor. The melt is then additionally heated and 3.75 weight percent of acetone blowing agent added based on the weight of the total composition. The mixture is then cooled to 229° C. before exiting the screw and entering an extrusion block from which it is extruded at a die temperature of 220° C. through a 0.104 inch circular orifice into a hot air chamber maintained at a temperature of 73°C. The solidified rod is then pulled through a shaping and sizing device to insure roundness and proper size.

Both the rod skin and end appearance are found to be uniform white color, with a small and uniform open cell structure. Density is 0.109 grams per cubic centimeter. When 27 millimeter sections of the rod are tested in a digital dilution tester marketed by Instrument Technical Representatives of 7400 White Pines Road of Richmond, Va. 23234, the average percent ventilation for 25 samples is found to be 38 percent. The average circumference of the sample rods is found to be 24.74 mm. The average density of the rod samples is found to be less than 0.11 grams per cc.

EXAMPLE 2

Figure 3:
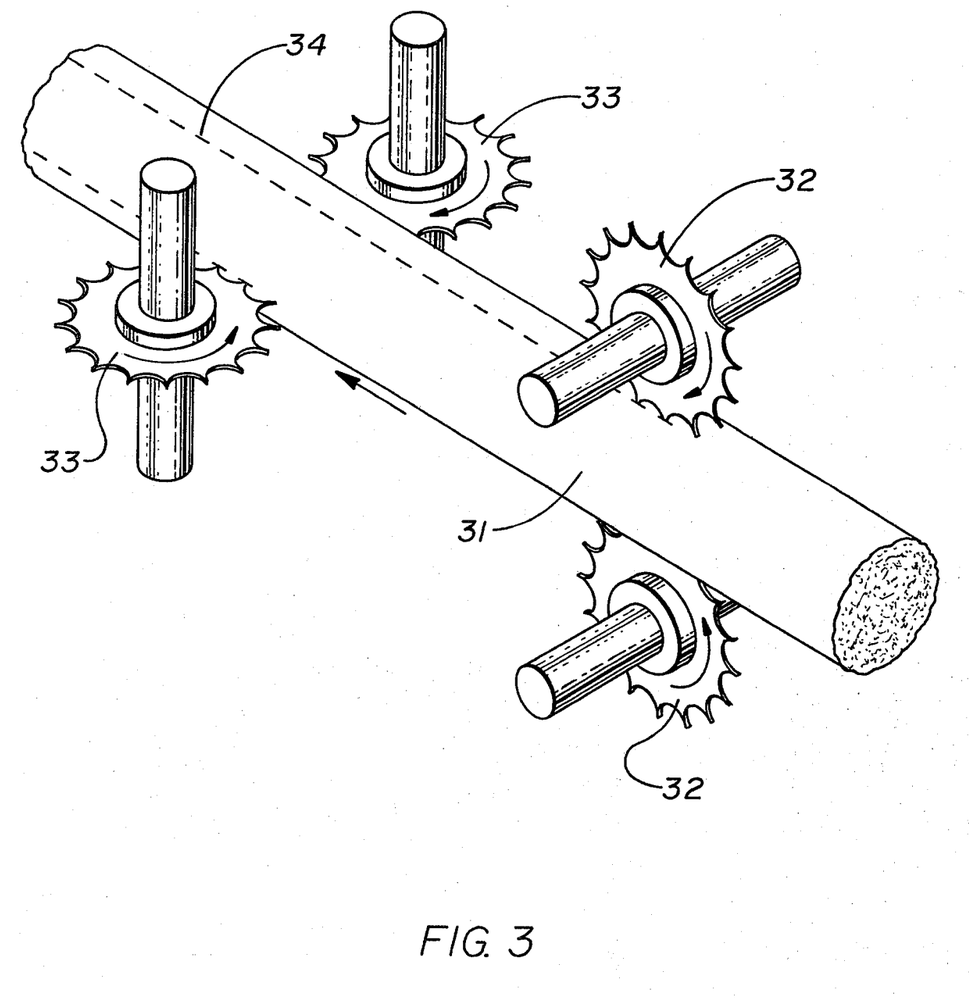
FIG. 3 is a projected view, not to scale, of one mechanical process for producing the ventilated filter element of this invention.

The process of Example 1 is repeated except that subsequent to pulling the solidified rod through a shaping and sizing device, the rod is passed through the mechanical device as illustrated in FIG. 3 of the drawings. Turning to FIG. 3 of the drawings, rod member 31 is pulled between non-driven vertical pin wheel members 32 and non-driven horizontal pin wheel members 33 so as to produce skin perforations 34. The pin wheel devices produce a registered deformation in the skin structure of the rod. When 27 millimeter filter rod samples, thus perforated, are tested in a digital dilution tester marketed by Instrument Technical Representatives, the samples are found to exhibit an average percent ventilation of 97.6 percent. The samples are found to have a circumference of 24.80 mm and an average density of less than 0.11 grams per cc.

EXAMPLE 3

Figure 4:
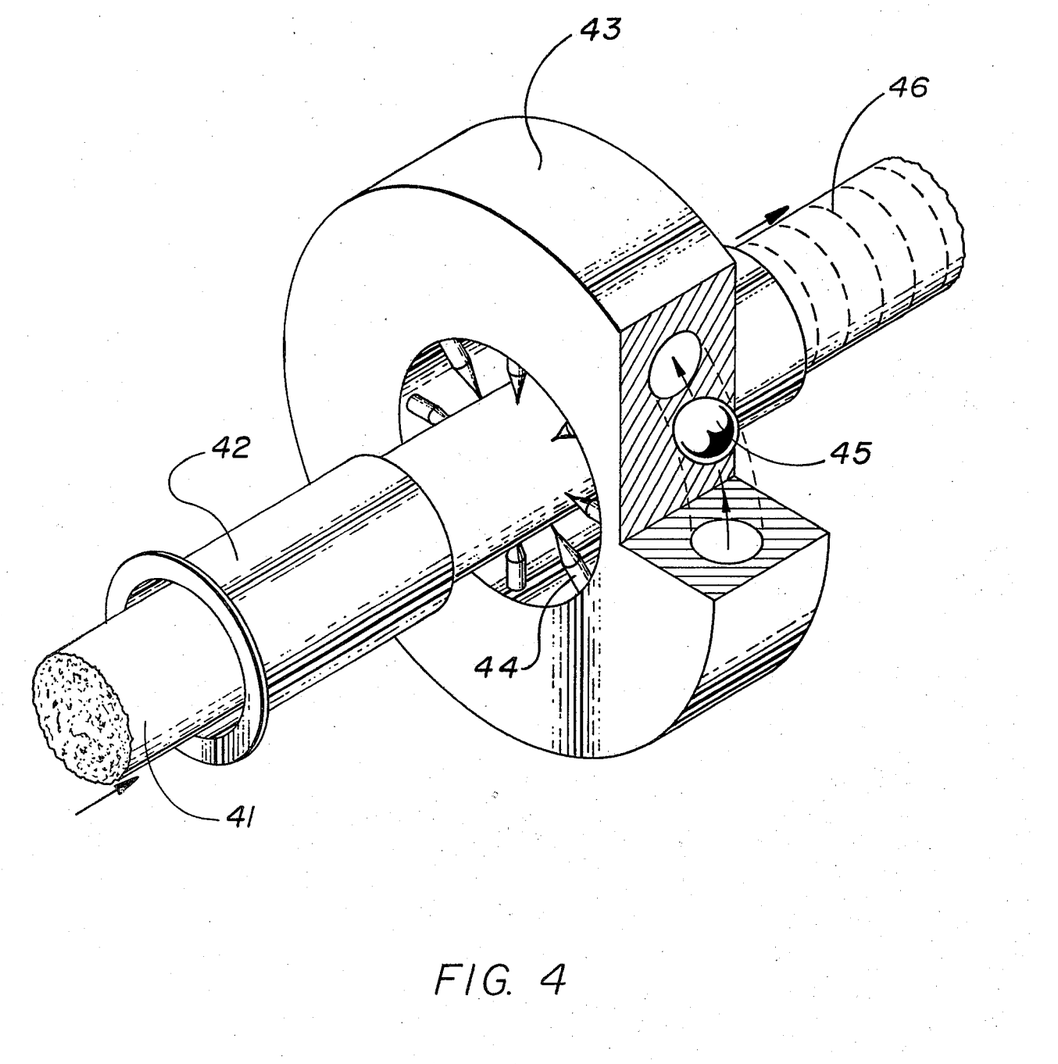
FIG. 4 is a projected view, not to scale, of another mechanical process for producing the ventilated filter element of this invention.

The process of Example 1 is repeated with the exception that the solidified rod, after being pulled through a shaping and sizing device, is passed through the mechanical device as illustrated in FIG. 4 of the drawings. Turning to FIG. 4 of the drawings, rod member 41 is pulled through guide member 42 and through an air driven eccentrically vibrating annulus 43, annulus 43 having inwardly projecting pin members 44 fixed thereto. Annulus 44 houses a ball member 45 in a race construction, ball member 45 being air driven and causing annulus 43 to vibrate in an eccentric fashion whereby pin members 44 produce perforations 46 in the skin of rod member 41. As can be seen from FIG. 4 of the drawings, the perforations are evenly spaced. When perforated rod samples 27 millimeters in length are tested in a digital dilution tester marketed by Instrument Technical Representatives, the average of the samples is found to exhibit a ventilation of 82.7 percent. The samples having an average circumference of 24.93 mm and an average density of less than 0.11 grams per cubic centimeter.

EXAMPLE 4

Figure 5:
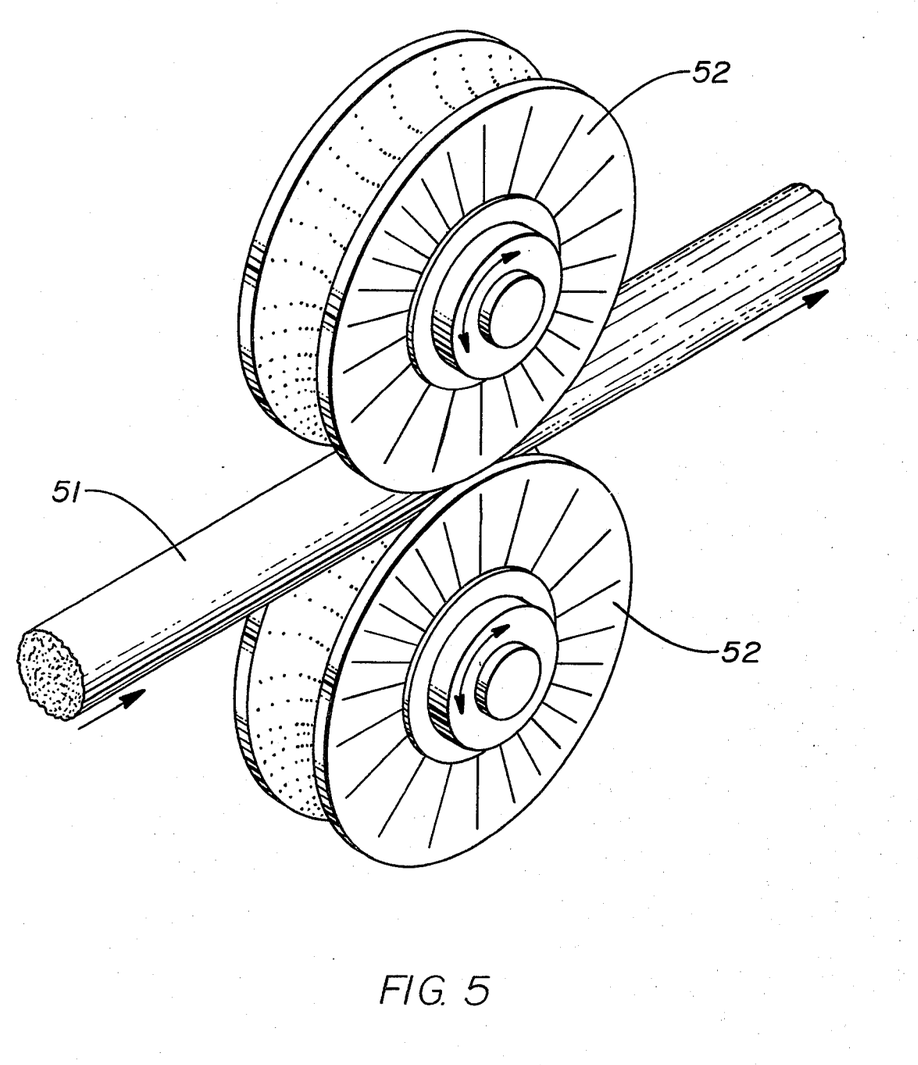
FIG. 5 is a projected view, not to scale, of still another mechanical process for producing the ventilated filter element of this invention.

The process of Example 1 is repeated with the exception that subsequent to solidification and pulling through a sizing and shaping device, the rod is passed into the mechanical device as illustrated in FIG. 5 of the drawings. As cen be seen in FIG. 5, a rod 51 is drawn through the nip of a pair of wire wheel brush members 52. The wire wheel brushes 52 have a groove member disposed therein, the rod being substantially encompassed by the upper and lower configuration of the wire wheel brush members. As can be seen in FIG. 5 of the drawings, the surface of the rod as a result of passage through the wire wheel brushes receives a multiplicity of longitudinal lacerations which are not entirely random in nature. When 27 millimeter long rod samples are taken from the wire wheel brush vented rods and tested in a digital dilution tester marketed by Instrument Technical Representatives, it is found that the average ventilation is 79.8 percent. The average circumference is 24.79 mm, while the average density is less than 0.11 grams per cubic centimeter.

EXAMPLE 5

Figure 2:
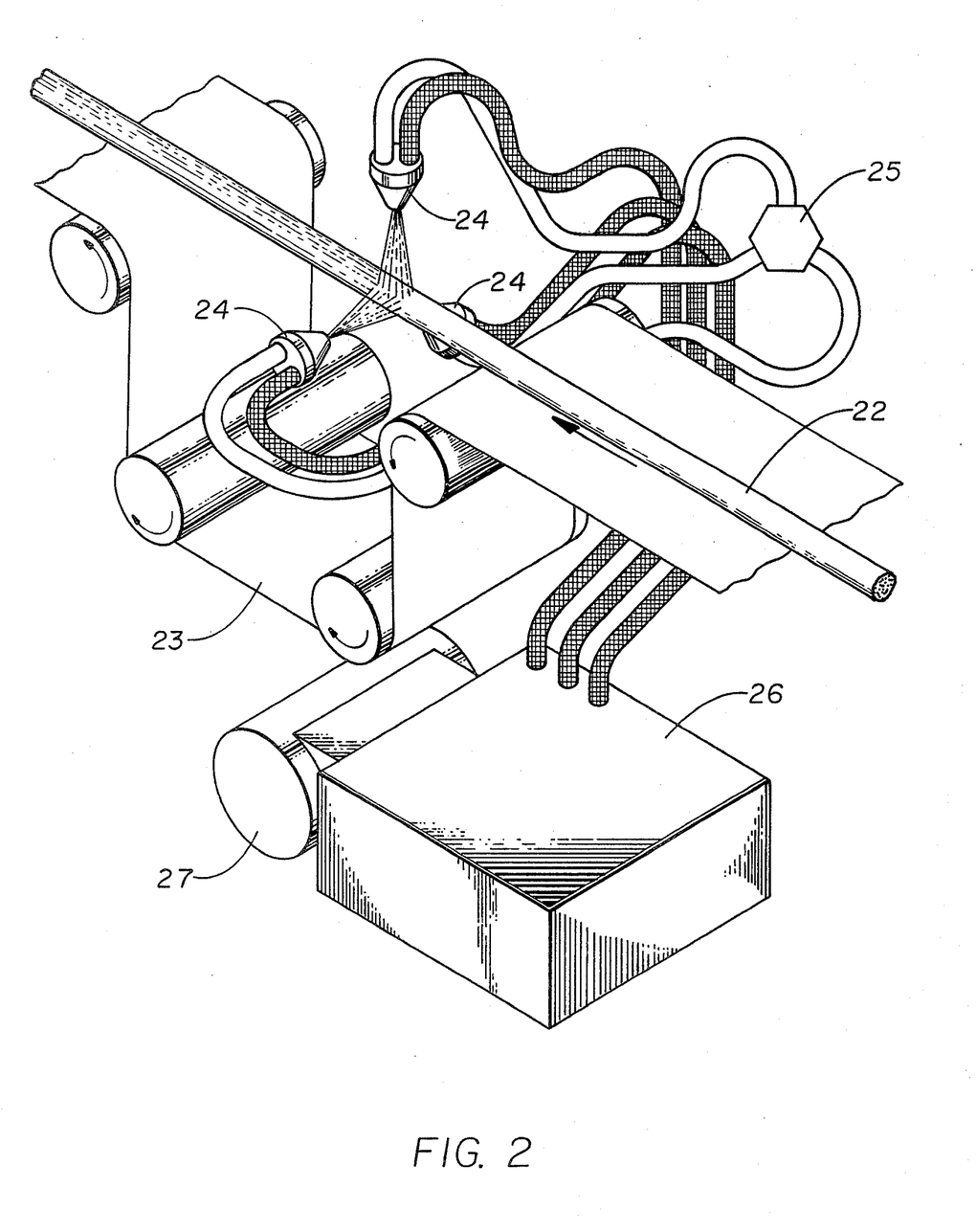
FIG. 2 is a schematic illustration of the conditioning cabinet employed in one process of the instant invention.

The process of Example 1 is repeated except that the hot air chamber conditioning cabinet is equipped as shown in FIG. 2 of the drawings. As can be seen in FIG. 2, an extrudate 22 is fed to a conditioning cabinet by means of a continuous belt member 23. Within the conditioning cabinet, spray nozzles 24 are positioned about the belt member 23, spray nozzles 24 being coupled to air supply 25 and solvent supply 26, the solvent being fed by pump member 27. Acetone is employed as a solvent and is fed at a rate of 0.15 gallons per hour per nozzle, the spray nozzles employing a solvent pressure of 10 lbs. per square inch and an air pressure of 20 lbs. per square inch. The solvent treated rod is then pulled through a shaping and sizing device to insure roundness and proper size. Twenty-seven millimeter long rod samples are then cut from the solvent treated rod and tested in a digital dilution tester marketed by Instrument Technical Representatives. The rods are found to have an average percent ventilation of 87.1 percent. The rods are found to exhibit totally random skin perforations which are the preferred configuration. The average circumference of the rod samples are found to be 24.86 mm and are found to have an average density of less than 0.11 grams per cubic centimeter.

EXAMPLE 6

The process of Example 1 is repeated except that the extrudate is passed over a plurality of fixed abrasive surfaces mounted under slight tension about the periphery of the extrudate, the abrasive surfaces comprising 280 grit silicon carbide paper. When the thus abraided rod samples 27 millimeters in length are tested in a digital dilution tester marketed by Instrument Technical Representatives, the average of the samples is found to exhibit a ventilation of 95.5%. The samples are found to have an average circumference of 24.72 millimeters and an average density of less than 0.11 grams per cubic centimeter.

EXAMPLE 7

The process of Example 1 is repeated except that subsequent to exiting from the hot air chamber conditioning cabinet, the extrudate is passed over a plurality of fixed pad members which are saturated with acetone and mounted under slight tension about the periphery of the extrudate. The acetone treatment is found to result in a product having a random distribution of pores throughout the skin structure, the random distribution being the preferred embodiment. When the resultant perforated product is cut into 27 millimeter lengths and then tested in a digital dilution tester marketed by Instrument Technical Representatives, it is found that the average percent ventilation is 94.3%. The average rod circumference is found to be 24.6 millimeters, the rods being found to have an average density of less than 0.11 grams per cubic centimeter.

EXAMPLE 8

Polypropylene of crystalline melting point about 170° C. and melt index 4.5 grams per 10 minutes (at 230° C. under a 2.16 kilogram weight) is blended with 12 percent of fresh limestone of average particle diameter of 5 microns based on the combined weight of limestone and polypropylene. The mixture is fed to a 3.81 centimeter diameter screw extruder equipped with a two-stage screw, a nozzle for injecting isobutylene under pressure into the extruder barrel and a circular orifice die of diameter of 1.6 millimeters and land 3.2 millimeters. A throughput of 530 grams per minute is employed with a melt temperature of 160° C. and a die temperature of 154°C., the resultant product is found to have a circumference of 25 millimeters and a density of 0.043 grams per cubic centimeter. When 27 millimeter samples are cut from the rod extrudate and tested in a digital dilution tester marketed by Instrument Technical Representatives, the samples are found to have an average ventilation of 4 percent.

EXAMPLE 9

Example 8 is repeated with the exception that the extrudate is passed through a pin perforating mechanism whereby 4 evenly spaced rows of pin punched holes, the holes being about $\frac{1}{8}$ inch apart, is obtained in the rod surface. The pin punched holes are of sufficient depth to completely penetrate the rod skin structure, without substantially disturbing the underlying foam structure. The resultant perforated product when cut into 27 millimeter lengths and tested in a digital dilution tester marketed by Instrument Technical Representatives is found to have an average percent ventilation of 89 percent. The rods are found to have average circumferences of 25 millimeters and an average density of 0.043 grams per cubic centimeter.

EXAMPLE 10

Example 8 is repeated with the exception that the extrudate is passed through a battery of 6 blade members evenly mounted under slight tension about the periphery of the extrudate. The blade members are positioned so as to completely penetrate the rod skin structure without substantially disturbing the underlying foam structure. The resultant product is found to have a circumference of 25 millimeters and a density of 0.043 grams per cubic centimeter. When 27 millimeter samples are cut from the rod extrudate and tested in a digital dilution tesster marketed by Instrument Technical Representatives, the samples are found to have an average ventilation of 81%.

Figure 6:
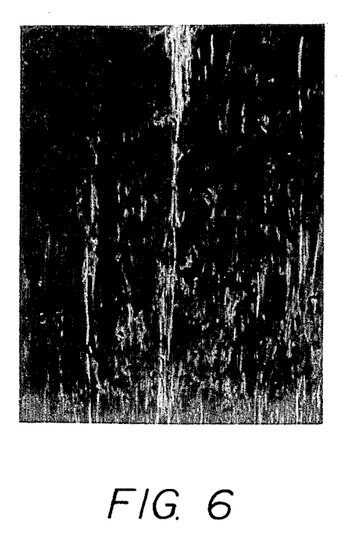
FIG. 6 is a photomicrograph magnified 20 times of the surface of an untreated melt extruded foamed cellulose acetate filter rod.
Figure 7:
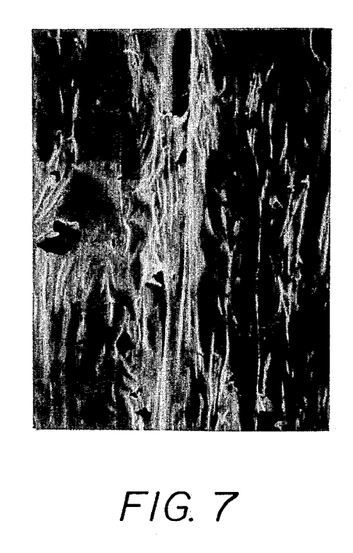
FIG. 7 is a photomicrograph magnified 100 times of the surface of an untreated melt extruded foamed cellulose acetate filter rod.
Figure 8:
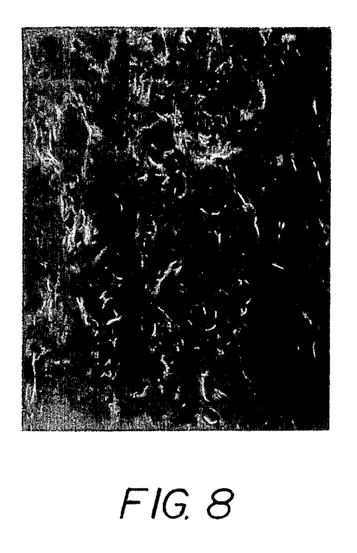
FIG. 8 is a photomicrograph magnified 20 times of the surface of the high ventilation level melt extruded cellulose acetate filter rod of one process of this invention.
Figure 9:
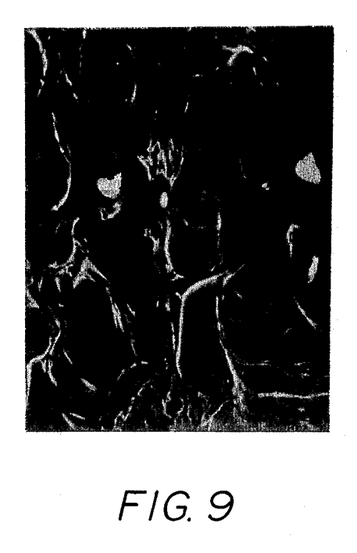
FIG. 9 is a photomicrograph magnified 100 times of the surface of the high ventilation level melt extruded cellulose acetate filter rod of one process of this invention.
Figure 10:
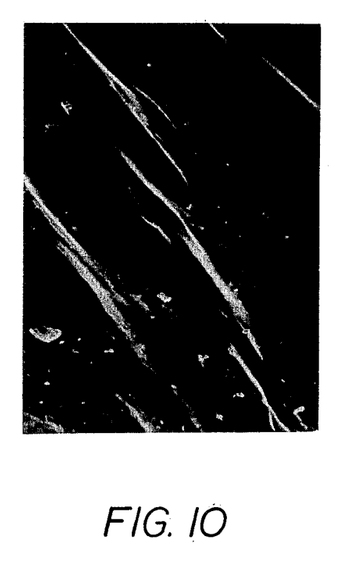
FIG. 10 is a photograph magnified 100 times of the surface of an untreated polypropylene filter rod.
Figure 11:
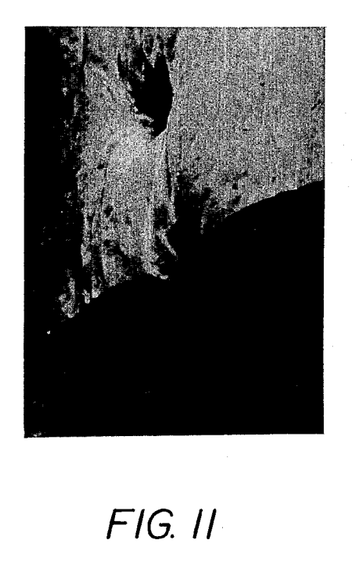
FIG. 11 is a photograph magnified 25 times of the surface of the high ventilation level melt extruded polypropylene filter rod of one process of this invention.

The affect of solvent treatment on the surface of a cellulose accetate rod may be readily seen in FIGS. 8 and 9 of the drawings The randomly distributed pores of FIGS. 8 and 9 of the drawings are in marked contrast to the substantially non-porous skin which may be seen in the untreated cellulose acetate filter rod of FIGS. 6 and 7. As previously noted, rendering the skin structure of a thermoplastic polymer foamed filter rod sufficiently porous so as to have a ventilation of greater than 50 percent will with the use of a selectively perforated tipping paper allow the manufacture of a variety of filter tip designs. When a completely random pore structure is obtained in the filter rod skin, the cigarette filter tip designs, which may be obtained, are virtually unlimited. It should be understood however, that mechanical treatments which do not result in a completely random surface affect are also incompassed by this invention. The effect of the mechanical treatment on the surface of a polypropylene foamed filter rod may be seen in FIG. 11 of the drawings. The deformed surface of FIG. 11 of the drawings is in marked contrast to the substantially non-porous skin which may be seen in the untreated polypropylene foamed filter rod of FIG. 10 of the drawings.

Having thus disclosed the invention, what is claimed is:

1. In a process for the preparation of a plasticized, open cell, foamed cellulose acetate filter rod having a high density substantially water impervious skin structure substantially covering the periphery thereof, said process comprising melt extruding to an eliptical or circular orifice of a screw extruder, a mixture of cellulose acetate, a non toxic taste compatible thermally stable plasticizer having a boiling point of not less than 180°C., a blowing agent which is at least a partial solvent for cellulose acetate, a non toxic, taste compatible, thermally stable plasticizer having a boiling point of not less than 180°C., a flowing agent which is at least a partial solvent for cellulose acetate and a nucleating agent, said melt being substantially free of entrained air, and the extrusion pressure profile being such as to prevent said blowing agent from backing up in said screw extruder, the steps comprising rendering said skin structure air and water pervious by exposure to a solvent selected from the group consisting of acetone, methylene chloride, triacetin, tetrahydrofuran, methyl ethyl ketone, diethylketone, dioxane, alkyl celluloses, low boiling organic acids, low boiling phenols and low boiling aldehydes, the porosity being sufficient to produce a rod ventilation of greater than 50 percent.

2. The process of claim 1 wherein said porosity is sufficient to produce a rod ventilation of greater than 85 percent.

3. The process of claim 1 wherein said solvent exposure step is a spraying step.

4. The process of claim 1 wherein said solvent is acetone. A cigarette filter rod comprising a thermoplastic polymer substantially open cell foam characterized by the presence of at least some cells which are bridged by fibrils, said rod being surrounded by a water and air pervious high density skin structure having a discontinuity such as to produce a rod ventilation of greater than 50 percent.

5. In the process for the preparation of an opened-cell foamed cellulose acetate or polypropylene polymer filter rod having a high density, substantially water impervious skin structure substantially covering the peripherie thereof, said process comprising melt extruding through an eliptical or circular orifice of a screw extruder, said polymer and blowing agent, the step of altering the skin structure of said filter rod by a solvent treating operation such as to produce a water and air pervious skin and a rod ventilation of greater than 50 percent.

6. In a process for the preparation of an opened-cell foamed cellulose acetate or polypropylene polymer filter rod having a high density, substantially water impervious skin structure substantially covering the peripherie thereof, said process comprising melt extruding through an eliptical or circular orifice of a screw extruder, said polymer and blowing agent, the step of altering the skin structure of said filter rod by means of a surface abrading operation such as to produce a water and air pervious skin and a rod ventilation of greater than 50 percent.

7. A cigarette filter rod comprising a cellulose acetate substantially opened-cell foam characterized by the presence of at least some cells which are bridged by fibrils, said rod being surrounded by a water and air pervious high density skin structure having a discontinuity such as to produce a rod ventilation of greater than 85 percent, said discontinuity being in the form of pores having an average size of from about 50 to 150 microns and frequency of from 15 to 500 pores per square millimeter, said pores being randomly disposed in the skin structure.

* * * * *